United States Patent [19]
Kamimura et al.

[11] Patent Number: 5,638,307
[45] Date of Patent: Jun. 10, 1997

[54] APPARATUS HAVING SOURCE POWER CONTROL UNIT RESPONSIVE TO VOLTAGE FLUCTUATION

[75] Inventors: Mitsuo Kamimura; Masao Tsunekawa, both of Kawasaki; Eisaku Takahashi, Higashine, all of Japan

[73] Assignee: Fujitsu Limited, Japan

[21] Appl. No.: 410,687

[22] Filed: Mar. 27, 1995

[30] Foreign Application Priority Data

Apr. 28, 1994 [JP] Japan ................................. 6-092156

[51] Int. Cl.$^6$ ................................. G06F 1/00; G11B 5/52; H02P 7/68
[52] U.S. Cl. ................................. 364/707; 361/78; 360/81; 318/3; 395/750
[58] Field of Search ................................. 364/707; 360/82, 360/87, 88, 100.1, 106, 81, 83–86; 307/2, 4, 31, 38, 39, 85–87; 318/141, 3, 433, 445; 361/78, 79, 86; 395/750

[56] References Cited

U.S. PATENT DOCUMENTS

| 4,864,287 | 9/1989 | Kievstead ................................. 340/648 |
| 5,481,733 | 1/1996 | Douglis et al. ................................. 395/750 |
| 5,493,670 | 2/1996 | Douglis et al. ................................. 395/750 |

FOREIGN PATENT DOCUMENTS

| 2-198074 | 8/1990 | Japan . |
| 4-273509 | 9/1992 | Japan . |
| 4-310668 | 11/1992 | Japan . |
| 5-137393 | 6/1993 | Japan . |

*Primary Examiner*—Roy N. Envall, Jr.
*Assistant Examiner*—Emmanuel L. Moise
*Attorney, Agent, or Firm*—Greer, Burns & Crain, Ltd.

[57] ABSTRACT

A disk apparatus wherein a disk is rotated by a rotating motor, and a source power supplied to the rotating motor is monitored, which includes: a memory unit for storing an initial source voltage value before a process of a rotating motor acceleration is started; a detecting unit for periodically detecting a source voltage value related to the source power; a comparing unit for comparing the source voltage value, detected by the detecting unit during the process of the rotating motor acceleration, with the initial source voltage value stored in the memory unit, and for outputting a voltage fluctuation indicated by a difference between the source voltage value and the initial source voltage value; and a control unit for setting a quantity of the source power supplied to the rotating motor, to a smaller quantity in response to the voltage fluctuation output by the comparing unit.

12 Claims, 9 Drawing Sheets

APPARATUS HAVING SOURCE POWER CONTROL UNIT RESPONSIVE TO VOLTAGE FLUCTUATION

BACKGROUND OF THE INVENTION

(1) Field of the Invention

The present invention relates to a disk apparatus which reads data from and writes data onto a disk, wherein the disk is rotated by a rotating motor in accordance with a source power, and the source power supplied to the rotating motor is monitored.

(2) Description of the Prior Art

Magnetic disk drives such as hard disk drives have been connected to host computers for a purpose of storing information. Recently, hard disk drives with a smaller size and a lighter weight have been developed and put into practical use, and they can be housed in small-size personal computers. Certain personal computers of a handy type are powered by a battery, instead of by being plugged into an electric outlet.

For the personal computers mentioned above that are powered by the battery, it is desirable that power consumption of such disk drives during operation be minimized and a faster rotation of the disk by a rotating motor be realized with a source voltage supplied from the battery.

FIG. 1 shows a conventional magnetic disk unit 11. In FIG. 1, the magnetic disk unit 11 includes an actuator 12, an arm 13, and a head 14. The head 14 is connected to one end of the arm 13 via a supporting spring member 13a. The head 14 is placed onto a magnetic disk 20, and is movable in a radial direction of the disk as indicated by a two-dot chain line in FIG. 1.

The arm 13 has a base portion which is rotatably supported onto a pivot 15, and the arm 13 is rotatable around the center of the pivot 15. The arm 13 has a supporting portion 16 at the other end thereof opposite to the head 14, and a coil 17 is attached to the supporting portion 16. The arm 13, when rotated by an electromotive force induced in the coil 17, is supported on the supporting portion 16.

Two magnets 18a and 18b are secured to a frame of the magnetic disk unit 11 and arranged below the coil 17. The coil 17 and the magnets 18a and 18b constitute a voice coil motor (VCM). This VCM serves to rotate the arm 13 around the pivot 15 by a small angle so that the head 14 is moved to a selected one of the tracks of the disk 20.

The disk 20 is placed onto a spindle 19 of a spindle motor (not shown in FIG. 1), and is rotated at high speed around the spindle 19 by the spindle motor. Electric power from a printed circuit board 21 is supplied to the coil 17 via a flexible print sheet 22, and the arm 13 is rotated around the pivot 15 by the coil 17 so that the head 14 is moved in the radial direction of the disk 20 to the selected track of the tracks of the disk 20.

In a case of a disk apparatus which is housed in a small-size computer powered by a battery, the electric charge of the battery supplied to the spindle motor may be too little, and thus the disk apparatus may be subjected to a lack of electric energy to start the rotation of the spindle motor. In addition, the disk apparatus may be abruptly powered off when the rotation of the spindle motor is started. If this takes place, data stored in the disk or data stored in a battery-backup random-access memory of the computer may be lost.

In order to prevent the stored data from being lost due to such a malfunction, it is necessary to monitor the source power supplied to the disk apparatus before the rotation of the spindle motor is started.

FIG. 2 shows a conventional source power monitoring system. In FIG. 2, a control unit 31 is connected to a sleep control circuit 32 and an SPM controller 33, and the SPM controller 33 is connected to a spindle motor (SPM) 34 of a disk device. The control unit 31 outputs a command to the SPM controller 33 to control the start and stop of the rotation of the SPM 34. The sleep control circuit 32 serves to stop a supply of source power to a specific portion of the system when no access is given to the disk device over a predetermined period, in order to reduce the consumption power to a certain extent.

In the conventional source power monitoring system, a source voltage Vcc of a battery and a predetermined reference voltage V1 are input to a comparator 35, and the source voltage Vcc is compared with the reference voltage V1. The comparator 35 outputs a fail signal to the control unit 31 when the source voltage Vcc is lower than the reference voltage V1. When the fail signal from the comparator 35 is received, the control unit 31 powers down the disk device.

The reference voltage V1 mentioned above is a criterion to ensure a high source voltage level and prevent stored information from being lost due to an abrupt powering down.

Japanese Laid-Open Patent Application No. 5-137393 discloses a power supply voltage monitoring unit which monitors the level of a source voltage supplied to a disk device. Unlike the comparator 35 of the conventional source power monitoring system, this monitoring unit is used to detect whether a source voltage at the start of the rotation of the spindle motor is greater than a reference voltage. In the disk device disclosed in the above publication, the current of the source power is varied in response to the source voltage level. When the source voltage level is low, the time to initially accelerate the rotation of the spindle motor to a steady speed is prolonged by varying the current of the source power supplied to the spindle motor, in order to stabilize the rotating speed of the spindle motor and to ensure safe data recording and reproducing.

In the above conventional source power monitoring system, the disk device is powered down if the source voltage Vcc is below the reference voltage V1. However, a great source current must be supplied from the battery to the spindle motor at the start of the rotation of the spindle motor. Thus, the above conventional source power monitoring system hardly reduces the consumption power of the disk device at the start of the rotation of the spindle motor.

In the above publication, an error in the source power of the disk device, if any, can be detected by a source power monitoring system when the voltage from the source power is lowered below a reference voltage. There is a problem, however, that unless the source voltage is lowered below the reference voltage, the system does not detect a small voltage fluctuation of the source power as being an error. In addition, there is a problem that the system cannot quickly transfer an error notification concerning the source power fluctuation to a host computer when the small voltage fluctuation of the source power is detected.

In order to prevent the above-described problems wherein information stored in the disk apparatus could be lost, it is desirable to quickly transfer an error notification signal to the host computer in response to a small voltage fluctuation, so that the notification of a defective battery is immediately addressed to the host computer.

SUMMARY OF THE INVENTION

Accordingly, it is a general object of the present invention to provide an improved disk apparatus in which the above-described problem is eliminated.

Another, more specific object of the present invention is to provide a disk apparatus which realizes a reduction of consumption power at a start of a rotation of a rotating motor in response to voltage fluctuations of a source power being monitored.

Still another object of the present invention is to provide a disk apparatus which can immediately transfer an error notification to a host system even if a small voltage fluctuation of the source power is detected.

The above-mentioned objects of the present invention are achieved by a disk apparatus which includes: a memory unit for storing an initial source voltage value before a rotation of a rotating motor is started; a detecting unit for periodically detecting a source voltage value related to a source power; a comparing unit for comparing the source voltage value, detected by the detecting unit during the rotation of the rotating motor, with the initial source voltage value stored in the memory unit, and for outputting a voltage fluctuation indicated by a difference between the source voltage value and the initial source voltage value; and a control unit for setting a quantity of the source power supplied to the rotating motor to a smaller quantity in response to the voltage fluctuation output by the comparing unit.

The above-mentioned objects of the present invention are also achieved by a disk apparatus which includes: a memory unit for storing an initial source voltage value before a rotation of a rotating motor is started; a detecting unit for periodically detecting a source voltage value related to a source power; a first comparing unit for comparing the source voltage value, detected by the detecting unit during the rotation of the rotating motor, with the initial source voltage value stored in the memory unit, and for outputting a voltage fluctuation indicated by a difference between the source voltage value and the initial source voltage value; a selecting unit for selecting one of a first mode and a second mode, wherein the first mode is selected by the selecting unit to set a quantity of the source power supplied to the rotating motor to a smaller quantity regardless of the voltage fluctuation, and the second mode is selected by the selecting unit to set the quantity of the source power supplied to the rotating motor to a smaller quantity in response to the voltage fluctuation; and a control unit for controlling the quantity of the source power supplied to the rotating motor, in accordance with either one of the first and second modes selected by the selecting unit.

According to the present invention, the voltage fluctuation, indicated by a difference between the initial source voltage value before the start of the SPM rotation and the source voltage value during the SPM rotation, is always monitored. The quantity of the source power supplied to the SPM is set to a smaller quantity in response to the voltage fluctuation being monitored. Thus, it is possible to realize a reduction of consumption power at the start of the rotation of the SPM. Also, when the voltage fluctuation during the SPM rotation is detected to be greater than a reference value, an error notification is transferred to the host system. Thus, it is possible to immediately transfer an error notification to the host system even if the voltage fluctuation is slight.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given of a disk apparatus in a first embodiment of the present invention.

Figure 3:
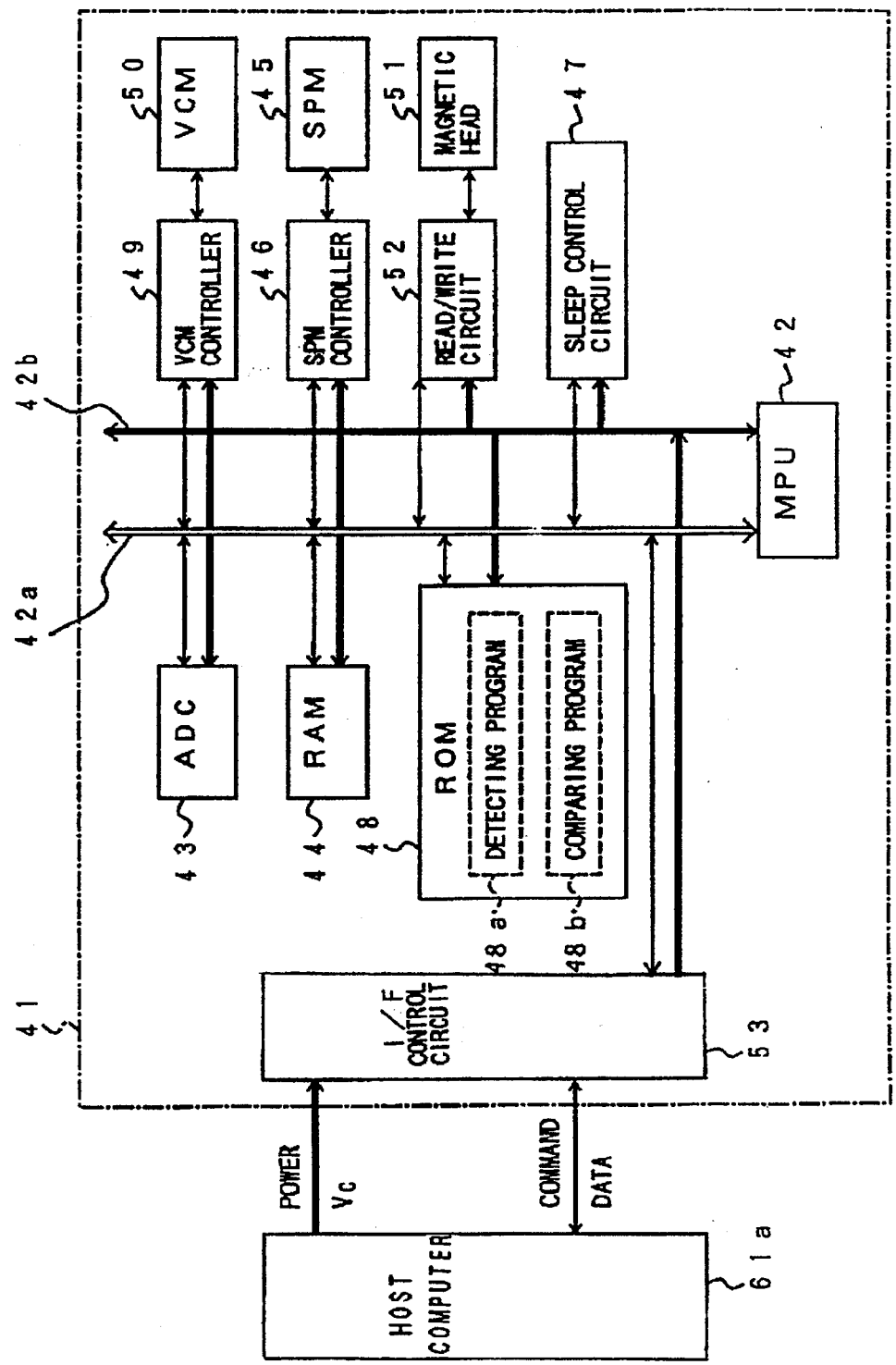
FIG. 3 is a block diagram of a disk apparatus in a first embodiment of the present invention.

FIG. 3 shows a magnetic disk unit 41 to which the first embodiment of the present invention is applied. In FIG. 3, the magnetic disk unit 41 and a host computer 61a are interconnected by a power line and a system bus.

The magnetic disk unit 41 includes a microprocessor unit (MPU) 42 which is connected to a data bus 42a and a source power bus 42b. Various component parts of the magnetic disk unit 41 and the MPU 42 are interconnected by the data bus 42a and the source power bus 42b as shown in FIG. 3. The MPU 42 constitutes a control unit of the present invention. A read-only memory (ROM) 48 is connected to the MPU 42 via the data bus 42a and the source power bus 42b. In the ROM 48, a source voltage detecting program 48a and a source voltage comparing program 48b are stored. The source voltage detecting program 48a stored in the ROM 48 is loaded into the MPU 42, and it constitutes a detecting unit of the present invention. Similarly, the source voltage comparing program 48b stored in the ROM 48 is loaded into the MPU 42, and it constitutes a comparing unit of the present invention.

Alternatively, the detecting unit and the comparing unit of the present invention may be constructed with circuit elements such as a comparator and a voltage measuring capacitor, instead of the programs described above.

The magnetic disk unit 41 includes an interface control circuit 53 to which source power from the host computer 61a is supplied via the power line. The source power, supplied to the interface control circuit 53, is further supplied to the source power bus 42b within the magnetic disk unit 41. In addition, the interface control circuit 53 is coupled to the data bus 42b within the magnetic disk unit 41. Thus, a command from the host computer 61a is transferred to the magnetic disk unit 41 via the system bus, and data written onto and read from a magnetic disk is transferred from and to the host computer 61a via the system bus.

The magnetic disk unit 41 includes an analog-to-digital converter (ADC) 43 and a random access memory (RAM) 44, and these parts are also connected to the MPU 42 via the data bus 42a and the source power bus 42b. The ADC 43 converts an analog signal of the source power into a digital value, and the source power value in the digital format is transferred from the ADC 43 to the MPU 42. The RAM 44 is a memory unit for storing an initial source voltage value before the rotating motor is started to rotate the disk, and it constitutes a memory unit of the present invention. Alternatively, an internal RAM provided within the MPU 42 may be used as the memory unit of the present invention.

The magnetic disk unit 41 includes a spindle motor (SPM) 45 and a SPM controller 46 for controlling the spindle motor 45. Data is read from or written onto a magnetic disk while the magnetic disk is rotated by the SPM 45. The SPM controller 46 is controlled by the MPU 42 via the data bus 42a and the source power bus 42b, to actuate the SPM 45. The magnetic disk unit 41 also includes a sleep control circuit 47 controlled by the MPU 42.

The magnetic disk unit 41 includes a voice coil motor (VCM) 50 and a VCM controller 49 for controlling the voice coil motor 50. The VCM controller 49 is controlled by the MPU 42 via the data bus 42a and the source power bus 42b, to actuate the VCM 50. The VCM 50 moves a head 51 relative to the disk in a radial direction of the disk, and the head 51 is used to read data from and write data onto the disk. The data read from or written onto the disk is transferred from the head 51 to the RAM 44 or vice versa by means of a read/write circuit 52.

The host computer 61a is powered by a battery, and a source voltage Vc of the battery is supplied to the magnetic disk unit 41. The source voltage Vc is supplied via the source power bus 42b to various component parts: the ADC 43, the RAM 44, the SPM controller 46, the VCM controller 49, the read/write circuit 52, and the sleep control circuit 47.

The host computer 61a sends a command or data to the magnetic disk unit 41 via the system bus in order to read data from and write data onto the disk. The interface control circuit 53 of the magnetic disk unit 41 transfers the command or data to and from the MPU 42 via the data bus 42a.

In the magnetic disk unit 41 described above, the ADC 43 converts an analog signal indicating source voltage, initially supplied from the host computer 61a to the SPM 45 before the rotation of the SPM 45 is started, into a digital value Vco. This value Vco is input to the MPU 42. The initial value Vco of the source voltage before the rotation of the SPM 45 is started is stored in the RAM 44.

The ADC 43 converts the source voltage, supplied to the SPM 45 during the rotation of the SPM 45, into a digital value Vct, and the source voltage value Vct is also input to the MPU 42. Thus, the MPU 42 monitors the initial source voltage value Vco before the start of the SPM rotation, and the source voltage value Vct during the rotation of the SPM 45.

The sleep control circuit 47 serves to stop the supply of source power to the SPM 45 or other portions of the magnetic disk unit 41 when the host computer 61a gives no access to the magnetic disk unit 41 over a predetermined period, in order to reduce the power consumption.

In the first embodiment described above, a first reference voltage Vo which is a criterion of a decision to power down the disk apparatus in response to the voltage fluctuation, and a second reference voltage V which is a criterion of a decision to start the low power consumption mode in response to the voltage fluctuation are preset in the MPU 42.

Figure 4:
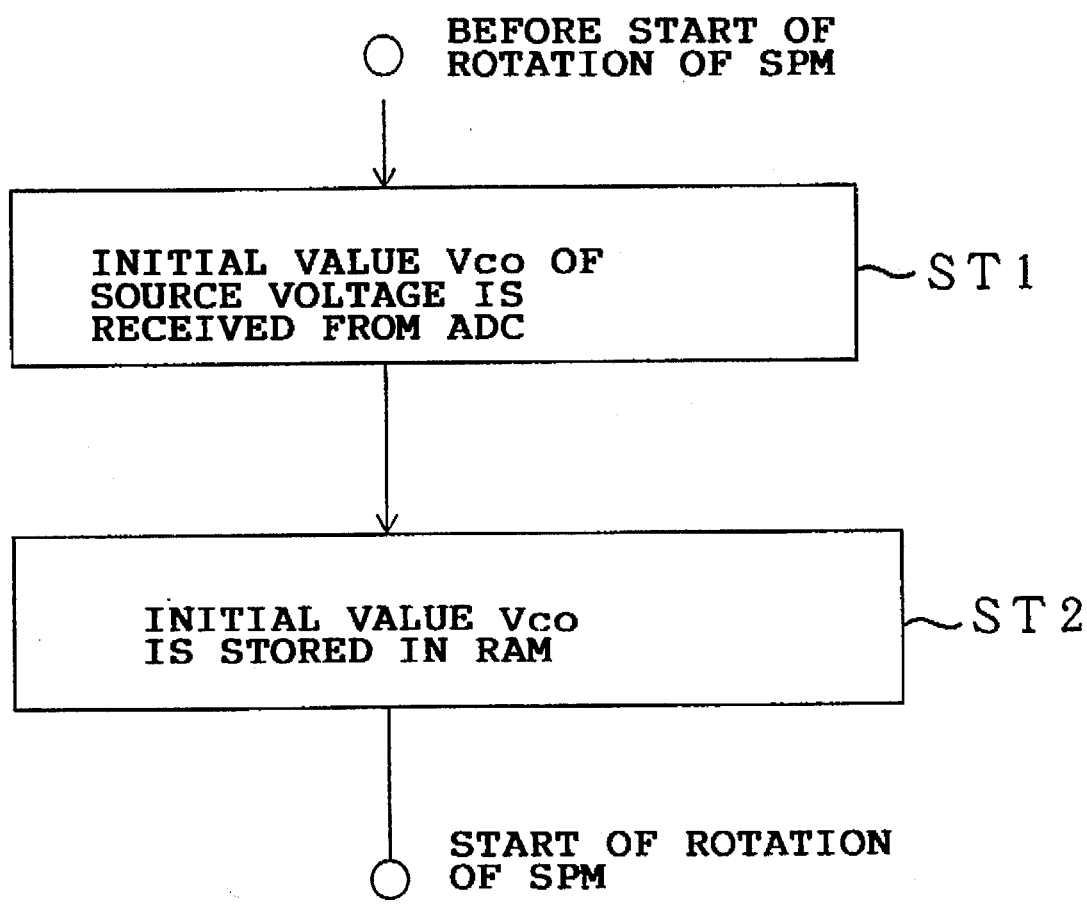
FIG. 4 is a flow chart for explaining a spindle motor starting procedure performed by the disk apparatus in FIG. 3.

FIG. 4 shows a spindle motor (SPM) starting procedure performed by the MPU 42 of the disk apparatus in FIG. 3.

In FIG. 4, the MPU 42 runs the detecting program 48a in the ROM 48 and receives from the ADC 43 the initial value Vco of the source voltage supplied to the SPM 45 before a process of a spindle motor (SPM 45) acceleration is started in the step ST1. Step ST2 stores the initial source voltage value Vco in the RAM 44.

After the value Vco is stored, the SPM controller 46 passes the voltage indicated by the MPU 42, through a digital-to-analog converter (DAC) and a sense resistor to produce an amount of current, and this current is supplied to the SPM 45, so that the SPM 45 starts to rotate the disk. The above procedure is carried out each time the process of the acceleration of the SPM 45 is started.

Figure 5:
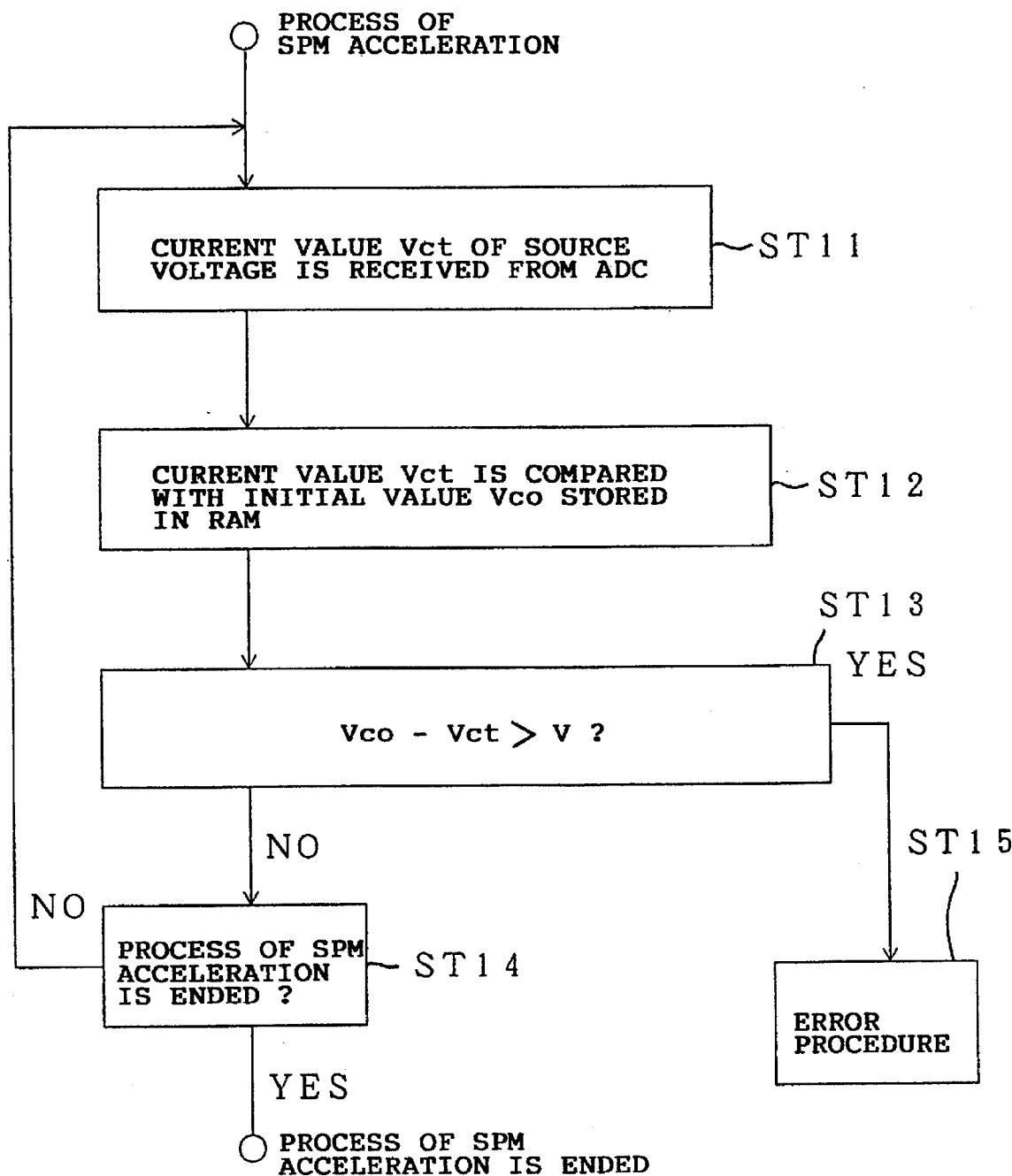
FIG. 5 is a flow chart for explaining a source voltage monitoring procedure performed by the disk apparatus in FIG. 3 during rotation of a spindle motor.

FIG. 5 shows a source voltage monitoring procedure performed by the MPU 42 of the disk apparatus in FIG. 3 during the process of the spindle motor acceleration.

In FIG. 5, the MPU 42 runs the detecting program 48a in the ROM 48 and receives from the ADC 43 the present value Vct of the source voltage during the process of the spindle motor (SPM 45) acceleration in the step ST11. Step ST12 runs the comparing program 48b in the ROM 48, and compares the present value Vct with the initial source voltage value Vco stored in the RAM 44, in accordance with the detecting program 48a.

The MPU 42 instructs, at given intervals of time, the ADC 43 to convert analog signals of source voltage to digital values. Thus, the MPU 42, the ROM 48 (the detecting program), and the ADC 43 constitute a detecting unit for periodically detecting a source voltage value concerning the source power. Each of the time intervals mentioned above is preset to, for example, initially 200 μs, and, after a steady speed of the SPM rotation is detected, it is preset to 350 μs.

In the above step ST12, the MPU 42 outputs a voltage fluctuation indicated by a difference between the initial source voltage value Vco (before the start of the process of the spindle motor acceleration) and the present source voltage value Vct (during the process of the spindle motor acceleration). This difference (Vco–Vct) represents a voltage fluctuation of the source power supplied to the SPM 45.

Step ST13 detects whether the voltage fluctuation indicated by the above difference is greater than the second reference voltage V. As described above, the second reference voltage V is a criterion of a decision to start the low power consumption mode for the source voltage monitoring, which voltage V is preset in the MPU 42.

If the voltage fluctuation is detected not to be greater than the second reference voltage V at the above step ST13, step ST14 detects whether the process of the spindle motor acceleration is ended. If the result at step ST14 is affirmative, the source voltage monitoring procedure is ended. If the result at step ST14 is negative, the source voltage monitoring procedure from the above step ST11 is performed again.

If the voltage fluctuation is detected to be greater than the second reference voltage V at the above step ST13, an error procedure is performed at step ST15. A description of the error procedure concerning the step ST15 will be given later, with reference to FIGS. 7 and 8.

Figure 6:
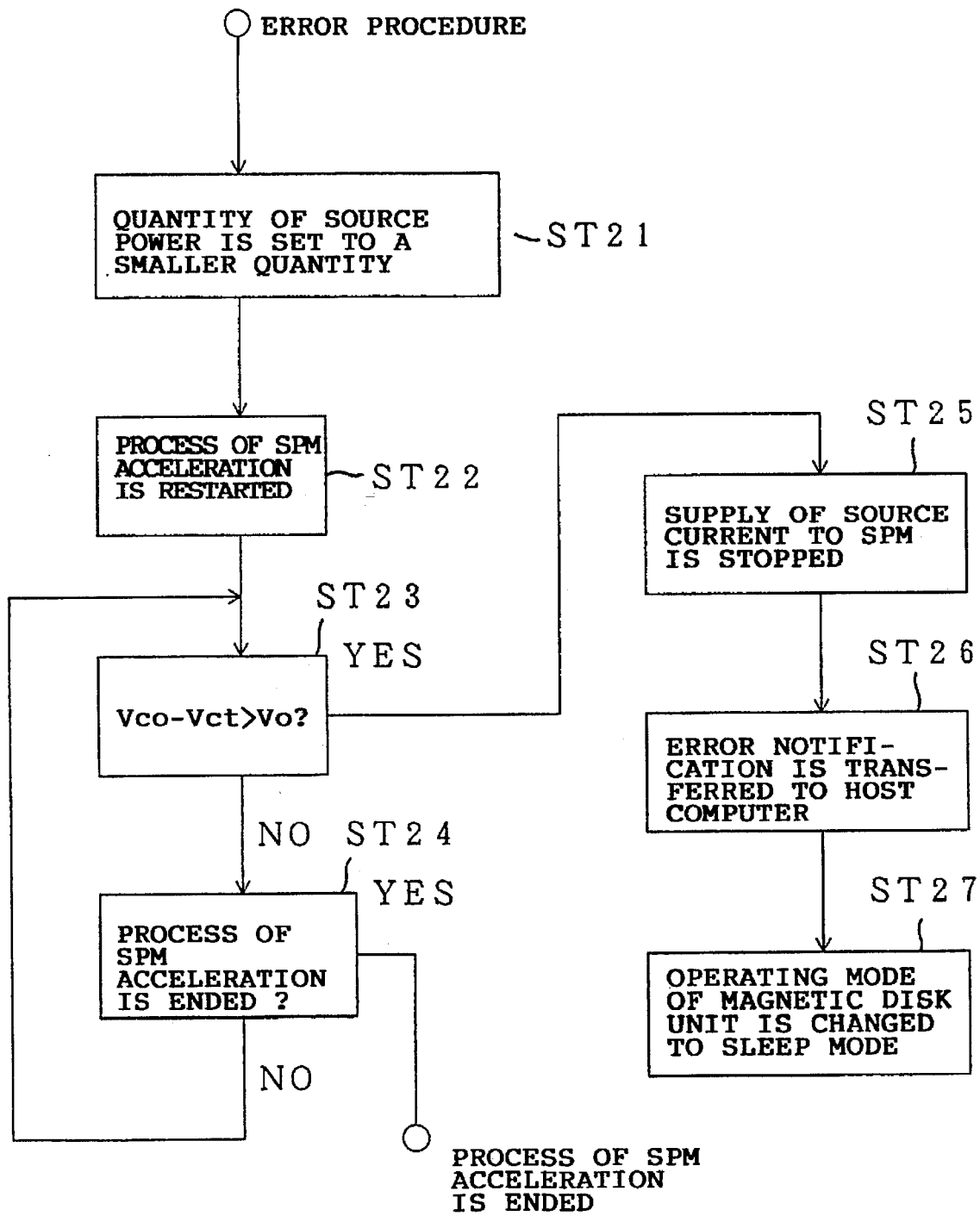
FIG. 6 is a flow chart for explaining an error procedure performed by the disk apparatus in FIG. 3.

FIG. 6 shows an error procedure performed by the MPU 42 of the disk apparatus in FIG. 3. This error procedure is performed when the voltage fluctuation is detected to be greater than the second reference voltage V.

The error procedure in FIG. 6 is started when the voltage fluctuation indicated by the difference (Vco–Vct) is detected to be greater than the second reference voltage V at the above step ST13. If the error procedure in FIG. 6 is started, the MPU 42 in step ST21 sets a quantity of the source power supplied to the SPM 45, to a smaller quantity.

Step ST22 restarts the process of the spindle motor acceleration in accordance with the reduced quantity of the source power set by the above step ST21.

After the process of the spindle motor acceleration is restarted, step ST23 detects whether a voltage fluctuation indicated by the difference (Vco–Vct) between the initial source voltage value Vco and a source voltage value Vct during the process of the spindle motor acceleration, is greater than the first reference voltage Vo. This step is similar to the step ST13 described above. Also, as described above, the first reference voltage Vo is a criterion of a decision to power down the magnetic disk unit 41 in response to the voltage fluctuation, which voltage Vo is preset in the MPU 42.

If the voltage fluctuation is detected not to be greater than the first reference voltage Vo at the above step ST23, it is determined that no error in the source power has occurred. Then, step ST24 detects whether the process of the spindle motor acceleration is ended. If the result at step ST24 is affirmative, the spindle motor acceleration procedure is ended. As long as the result at step ST24 is negative, the above-described steps ST23 and ST24 are performed again.

On the other hand, if the voltage fluctuation is detected to be greater than the first reference voltage Vo at the above step ST23, it is determined that an error in the source power has occurred. Then, step ST25 stops the supply of the source current to the SPM 45. Step ST26 transfers an error notification (or, a notification of battery change) to the host computer 61a because an error in the source power is detected. Step ST27 changes the operating mode of the magnetic disk unit 41 to a sleep mode. Thus, the magnetic disk unit 41 in this case is run in the sleep mode, and the supply of the source current to the VCM 50 and the read/write circuit 52 is stopped by using the sleep control circuit 47, thereby minimizing the consumption power.

Apart from the error procedure in FIG. 6, there is also another procedure in which the sleep control circuit 47 is instructed to stop the supply of the source power to the VCM 50, the read/write circuit 52 and the SPM 45, in accordance with a command from the host computer 61a.

Generally, an approximate acceleration of the rotation of the SPM 45 when started, is represented by the formula: (the torque coefficient/the inertia)×(the starting current). The value of the acceleration mentioned above is proportional to the starting current supplied to the SPM 45 when started. Thus, a reduction of the starting current makes the acceleration value of the rotation of the SPM 45 smaller. It is necessary that an initial acceleration of the rotation of the SPM 45 be reduced, in addition to reducing the starting current supplied to the SPM 45, if the SPM 45 performs a holeless type starting sequence including a parameter related to the spindle motor acceleration.

Figure 7:
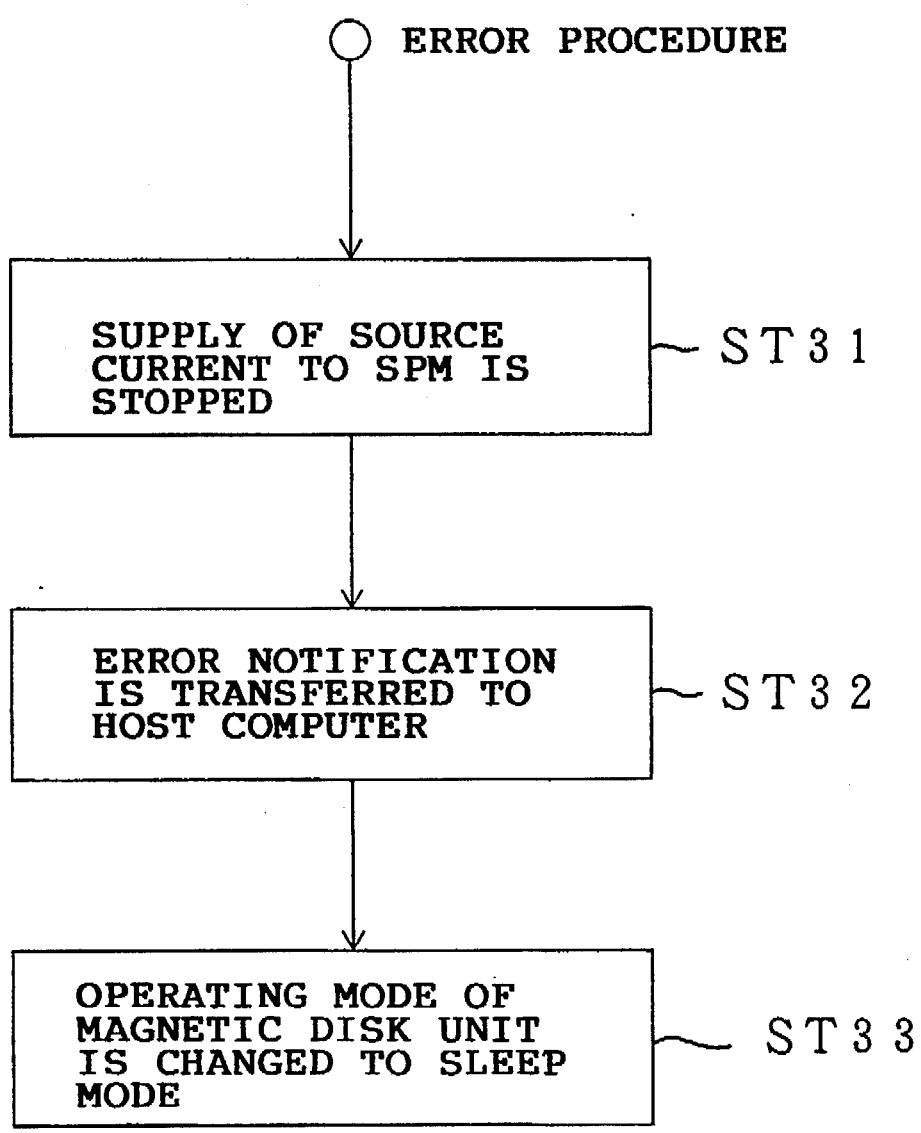
FIG. 7 is a flow chart for explaining another error procedure performed by the disk apparatus in FIG. 3.

FIG. 7 shows another error procedure performed by the MPU 42 of the disk apparatus in FIG. 3. This error procedure is performed when the voltage fluctuation is detected to be greater than the second reference value V after the process of the spindle motor acceleration is started in accordance with a rated quantity of the source power. Since the voltage fluctuation output by the comparing program when the process of the spindle motor acceleration is started in accordance with the rated quantity of the source power, is detected to be greater than a reference value, the supply of the source power to the SPM 45 is stopped, and an error notification is transferred to the host system according to the error procedure in FIG. 7.

When the error procedure in FIG. 7 is started, step ST31 immediately stops the supply of the source power to the SPM 45. Step ST32 transfers an error notification (or, a notification of battery change) to the host computer 61a because an error in the source power is detected. Step ST33 changes the operating mode of the magnetic disk unit 41 to the sleep mode. When the magnetic disk unit 41 is running in the sleep mode, the supply of the source power to the VCM 50 and the read/write circuit 52 is stopped, in addition to stopping the supply of the source power to the SPM 45.

In the first embodiment described above, the voltage fluctuation, indicated by a difference between the initial source voltage value before the start of the process of the spindle motor acceleration and the source voltage value during the process of the spindle motor acceleration, is always monitored. The quantity of the source power supplied to the SPM is set to a smaller quantity in response to the voltage fluctuation being monitored. Thus, it is possible to realize a reduction of power consumption at the start of the process of the spindle motor acceleration. Also, when the voltage fluctuation during the process of the spindle motor acceleration is detected to be greater than a reference value, an error notification signal is transferred to the host system. Thus, it is possible to quickly transfer an error notification signal to the host system even if the voltage fluctuation is slight.

In the first embodiment described above, after the supply of the source power to the SPM is stopped, the MPU 42 enables the magnetic disk unit 41 to be run in the sleep mode wherein the supply of the source power to the read/write circuit 52 is further stopped. Thus, the disk apparatus in the first embodiment realizes a reduction of power consumption when it is run in such operating conditions.

Next, a description will be given of a host computer in a second embodiment of the present invention, with reference to FIG. 8.

Figure 1:
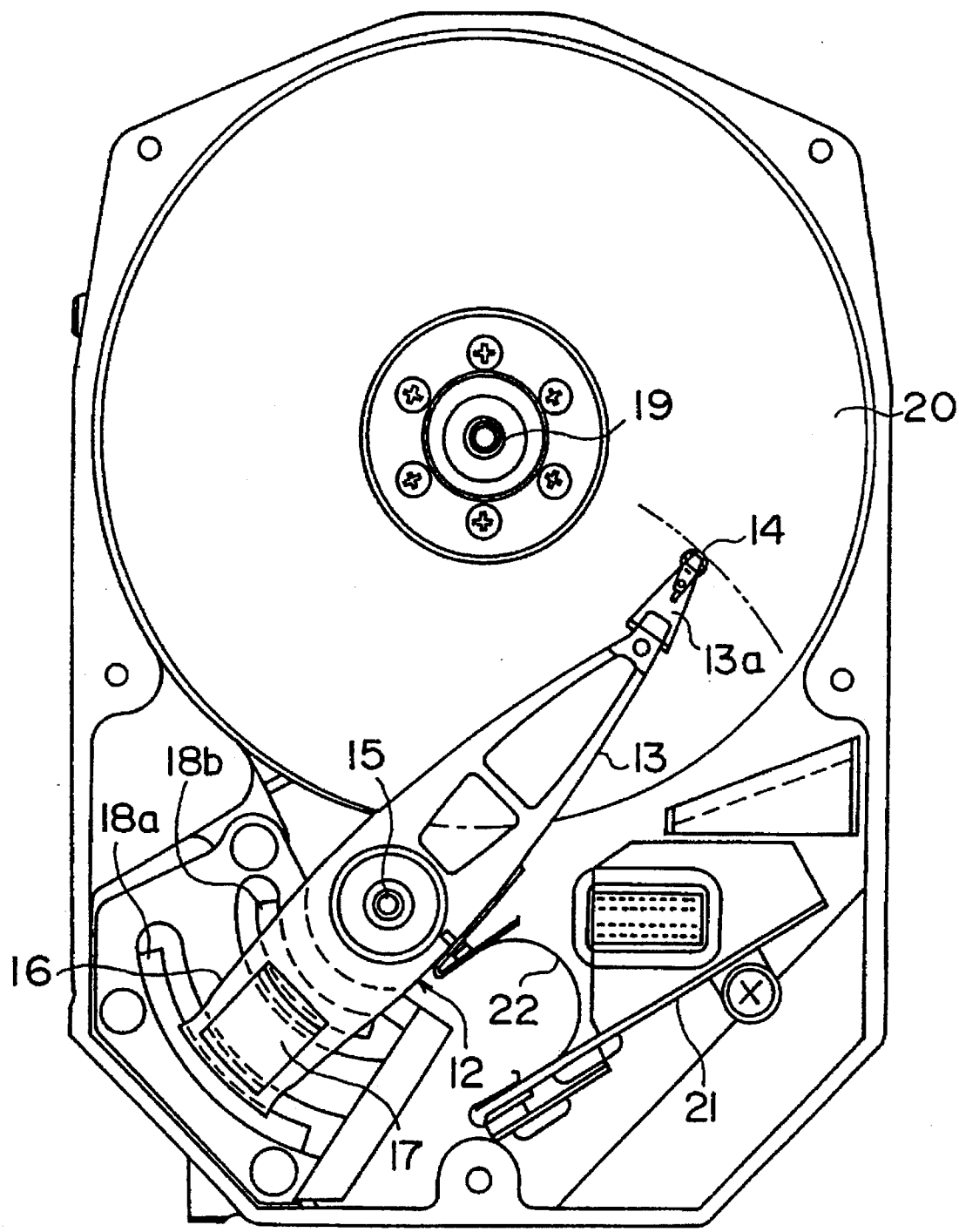
FIG. 1 is a plan view of a conventional magnetic disk unit.
Figure 2:
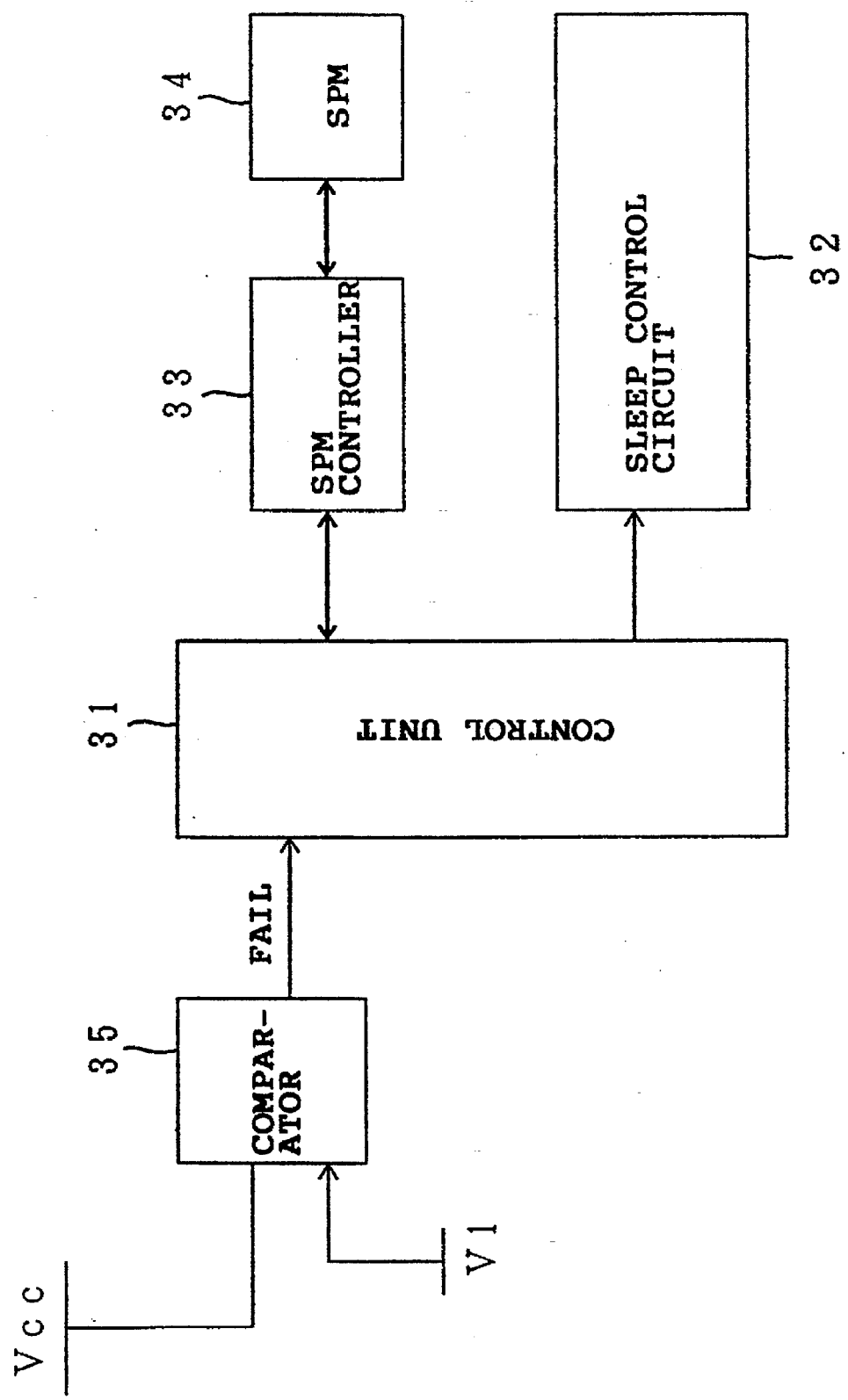
FIG. 2 is a block diagram showing a conventional source power monitoring system.
Figure 8:
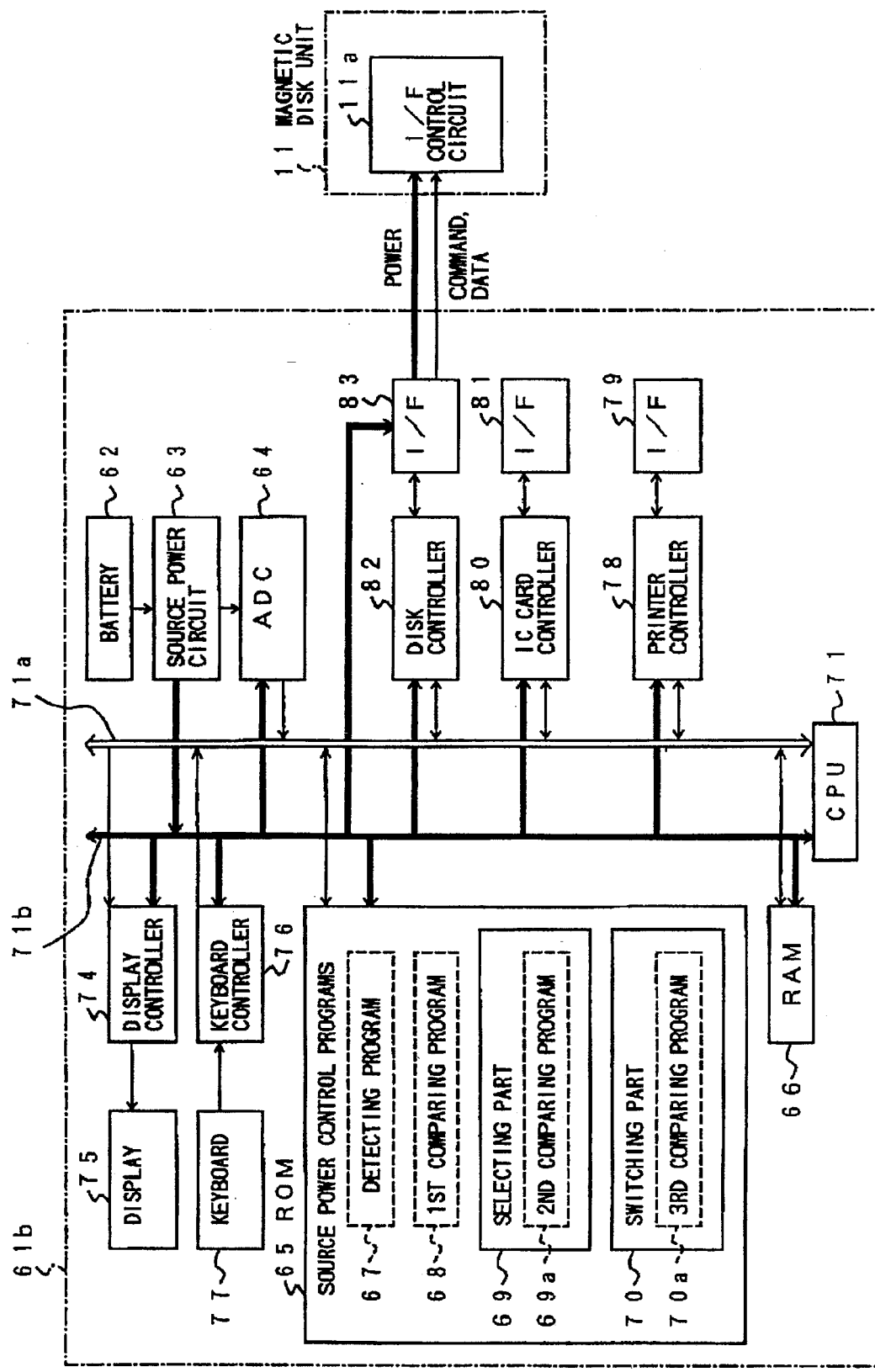
FIG. 8 is a block diagram of a host computer in a second embodiment of the present invention.

FIG. 8 shows a host computer 61b in the second embodiment of the present invention. In FIG. 8, the host computer 61b and the magnetic disk unit 11 are interconnected by a power line and a system bus. The magnetic disk unit 11 includes an interface control circuit 11a to which the power line and the system bus from the host computer 61b are connected. Also, the magnetic disk unit 11 includes a conventional source voltage monitoring system which is similar to that shown in FIG. 2.

In FIG. 8, the host computer 61b includes a central processing unit (CPU) 71 which is connected to a data bus 71a and a source power bus 71b. Various component parts of the host computer 61b and the CPU 71 are interconnected by the data bus 71a and the source power bus 71b as shown in FIG. 8. The host computer 61b is powered by a battery 62, and a source voltage Vc from the battery 62 is supplied by a source power circuit 63 to the source power bus 71b within the host computer 61b. The battery 62 may be a cartridge type or a rechargeable type. The CPU 71 constitutes a control unit of the present invention for controlling the quantity of the source power supplied from the battery to the magnetic disk unit 11.

The host computer 61b includes a display controller 74 and a keyboard controller 76 which are connected to the CPU 71 via the data bus 71a and the source power bus 71b. The display controller 74 controls a display 75 under the control of the CPU 71, and the keyboard controller 76 controls a keyboard 77. Also, the host computer 61b includes a printer controller 78 and an IC card controller 80 which are connected to the CPU 71 via the data bus 71a and the source power bus 71b. The printer controller 78 is connected to an external printer unit via an interface (I/F) 79, and controls the printer unit under the control of the CPU 71. The IC card controller 80 is connected to an IC card driver via an interface (I/F) 81, and controls the IC card driver under the control of the CPU 71.

Also, the host computer 61b includes a disk controller 82 connected to the CPU 71 via the data bus 71a and the source power bus 71b. The disk controller 82 is connected to the magnetic disk unit 11 via an interface (I/F) 83. A command and a source power from the host computer 61b are sent to the magnetic disk unit 11 via the system bus and the power line, and data from and to the host computer 61b is transferred to and supplied from the disk of the magnetic disk unit 11 via the system bus.

An analog-to-digital converter (ADC) 64 and a read-only memory (RAM) 66 are connected to the CPU 71 via the data bus 71a and the source power bus 71b. The ADC 64 converts an analog signal of the source power into a digital value, and the source power value from the ADC 64 is transferred to the CPU 71 via the data bus 71a. The RAM 66 is a memory unit for storing an initial source voltage value before the rotating motor (SPM) is started to rotate the disk. This RAM constitutes the memory unit of the present invention.

A read-only memory (ROM) 65 is also connected to the CPU 71 via the data bus 71a and the source power bus 71b. In the ROM 65, a source voltage detecting program 67 and a first comparing program 68 are stored. The source voltage detecting program 67 stored in the ROM 65 is loaded into the CPU 71, and it constitutes a detecting unit which periodically detects a source voltage value related to the battery 62. The first comparing program 68 stored in the ROM 65 is loaded into the CPU 71, and it constitutes a first comparing unit which compares the source voltage value detected during the process of the rotating motor acceleration, with the initial source voltage value stored in the RAM 66, and outputs a voltage fluctuation indicated by a difference between the source voltage value and the initial source voltage value.

Similarly to the first embodiment, in this second embodiment, a first reference value Vo which is a criterion of a decision to stop the supply of the source power to the disk apparatus in response to the voltage fluctuation, and a second reference value V which is a criterion of a decision to start the low consumption power mode in response to the voltage fluctuation are preset in the CPU 71.

The ROM 65 further includes a selecting part 69 and a switching part 70. The selecting part 69 selects one of a low power mode and an error mode in response to the voltage fluctuation. The low power mode is selected by the selecting part 69 to set a quantity of the source power supplied to the rotating motor to a smaller quantity regardless of the voltage fluctuation. The error mode is selected by the selecting part 69 to set the quantity of the source power supplied to the rotating motor to a smaller quantity in response to the voltage fluctuation.

A second comparing program 69a is stored in the selecting part 69 of the ROM, and it is loaded into the CPU 71 to constitute a second comparing unit of the present invention. The second comparing unit detects whether the voltage fluctuation is greater than the second reference voltage V. When the voltage fluctuation is detected to be greater than V, the low power mode is selected by the selecting part 69 to supply the smaller quantity of the source power to the rotating motor, regardless of the voltage fluctuation. When the voltage fluctuation is detected not to be greater than V, the error mode is selected by the selecting part 69 to supply the smaller quantity of the source power to the rotating motor in response to the voltage fluctuation.

The switching part 70 of the ROM 65 selects one of a low power mode and a stop mode after the smaller quantity of the source power is supplied to the rotating motor in accordance with either one of the low power mode and the error mode selected by the selecting part 69. The low power mode is selected by the switching part 70 to set the quantity of the source power supplied to the rotating motor to a smaller quantity in response to the voltage fluctuation. The stop mode is selected by the switching part 70 to stop the supply of the source power to the rotating motor.

Also, a third comparing program 70a is stored in the switching part 70 of the ROM, and it is loaded into the CPU 71 to constitute a third comparing unit of the present invention. The third comparing unit detects whether the voltage fluctuation, output by the first comparing unit 68 after the smaller quantity of the source power is supplied to the rotating motor, is greater than the first reference value Vo. When the voltage fluctuation mentioned above is detected to be greater than Vo, the low power mode is selected by the switching part 70 to supply the smaller quantity of the source power to the rotating motor in response to the voltage fluctuation. When the voltage fluctuation mentioned above is detected not to be greater than Vo, the stop mode is selected by the switching part 70 to stop the supply of the source power to the rotating motor.

Alternatively, the detecting unit 67 and the first, second and third comparing units 68, 69a and 70a described above may be constructed with circuit elements instead of the programs described above.

In the second embodiment of the present invention described above, one of the programs in the ROM 65 of the host computer 61b is loaded into the CPU 71 and a source voltage monitoring of the source voltage Vc supplied to the magnetic disk unit 11 is carried out by the CPU 71 in accordance with the loaded program. A spindle motor starting procedure of the spindle motor (SPM) of the magnetic disk unit 11 is carried out under the control of the CPU 71 of the host computer 61b.

In the host computer 61b described above, an initial source voltage value Vco before the spindle motor (SPM) of the magnetic disk unit 11 starts to rotate the disk, is stored in the RAM 66.

The detecting program 67 in the ROM 65 is loaded into the CPU 71, and the CPU 71 periodically detects a source voltage value Vct related to the source power. The first comparing program 68 in the ROM 65 is loaded into the CPU 71, and the CPU 71 compares the source voltage value Vct, detected during the process of the spindle motor acceleration, with the initial source voltage value Vco stored in the RAM 66, and outputs a voltage fluctuation indicated by a difference between the source voltage value Vct and the initial source voltage value Vco.

The selecting part 69 of the ROM 65 selects one of a first mode and a second mode, wherein the first mode is selected by the selecting part 69 to set a quantity of the source power supplied to the SPM, to a smaller quantity regardless of the voltage fluctuation, and wherein the second mode is selected by the selecting part 69 to set the quantity of the source power supplied to the SPM, to a smaller quantity in response to the voltage fluctuation. The CPU 71 controls the quantity of the source power supplied to the SPM, in accordance with either one of the first and second modes selected by the selecting part 69.

The second comparing program 69a in the ROM 65 is loaded into the CPU 71, and the CPU 71 detects whether the voltage fluctuation is greater than the second reference value V. When the voltage fluctuation is detected to be greater than V, the first mode is selected by the selecting part 69 to supply the smaller quantity of the source power to the SPM, regardless of the voltage fluctuation. Even if the remaining capacity of the source power of the battery is high enough, the disk apparatus of this embodiment starts the process of the spindle motor acceleration by supplying the reduced quantity of the source power to the SPM. Thus, the disk apparatus in this embodiment increases the operating life of the battery of the host computer.

On the other hand, when the voltage fluctuation is detected not to be greater than V, the second mode is selected by the selecting part 69 to supply the smaller quantity of the source power to the SPM in response to the voltage fluctuation.

The switching part 70 of the ROM 65 selects one of a third mode and a fourth mode after the smaller quantity of the source power is supplied to the rotating motor in accordance with the second mode. The third mode is selected by the switching part 70 to set the quantity of the source power supplied to the rotating motor to a smaller quantity in response to the voltage fluctuation. The fourth mode is selected by the switching part 70 to stop the supply of the source power to the SPM.

The third comparing program 70a in the ROM 65 is loaded into the CPU 71, and the CPU 71 detects whether the voltage fluctuation, output by the first comparing program 68 after the smaller quantity of the source power is supplied to the SPM, is greater than the first reference value Vo. When the above voltage fluctuation is detected to be greater than Vo, the third mode is selected by the switching part 70 to supply the smaller quantity of the source power to the SPM in response to the voltage fluctuation. On the other hand, when the above voltage fluctuation is detected not to be greater than Vo, the fourth mode is selected by the switching part 70 to stop the supply of the source power to the SPM.

Similarly to the first embodiment, the sleep control circuit 47 may be provided in the disk apparatus in the second embodiment. In the case of a magnetic disk unit in which the sleep control circuit 47 is provided, after the supply of the source power to the SPM is stopped, the CPU 71 enables the magnetic disk unit to be run in a sleep mode wherein the supply of the source power to a read/write circuit which drives the disk is further stopped.

Figure 9:
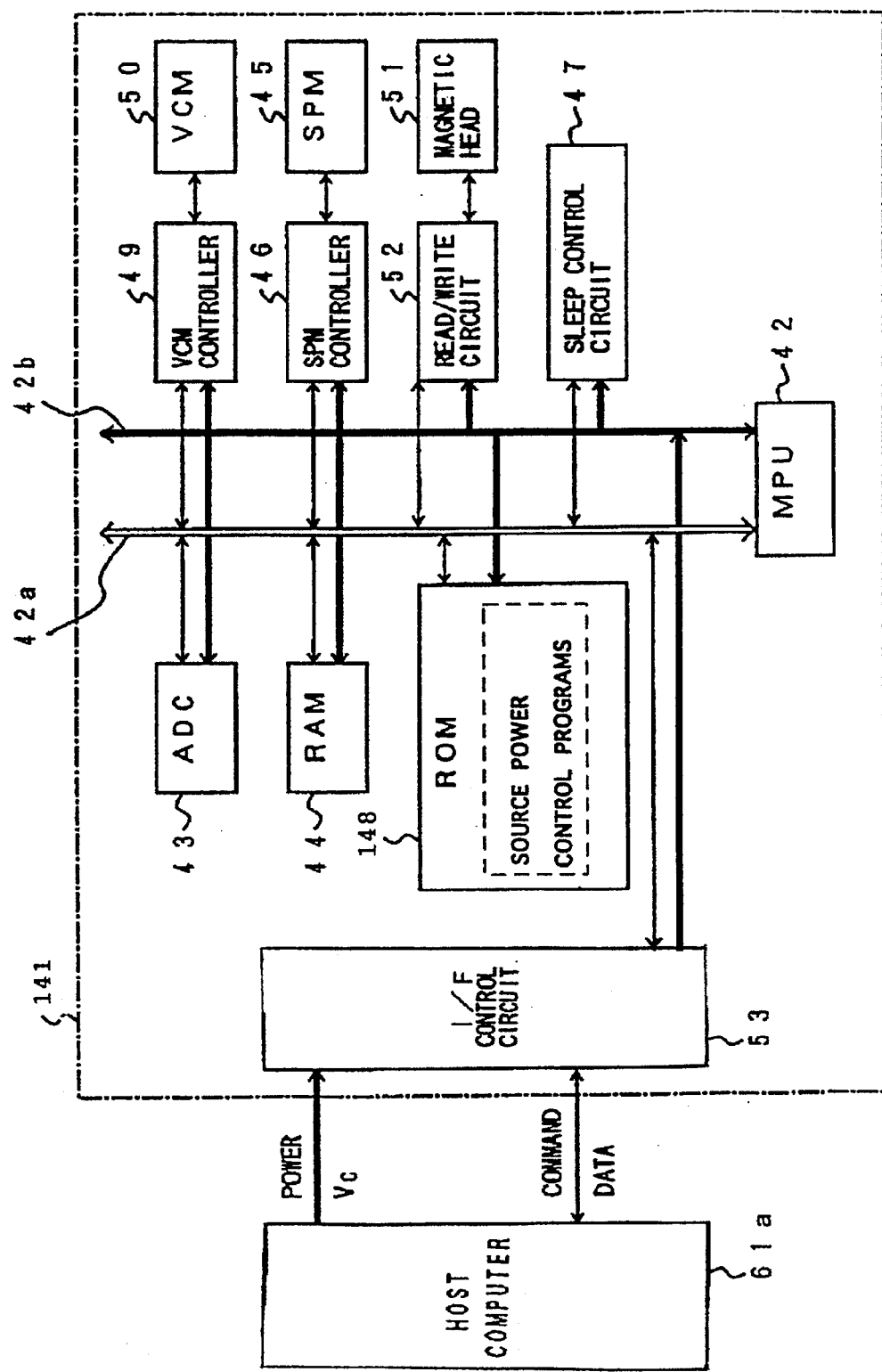
FIG. 9 is a block diagram of a disk apparatus in a third embodiment of the present invention.

In addition, FIG. 9 shows a magnetic disk unit 141 to which the above second embodiment of the present invention is applied. In FIG. 9, the magnetic disk unit 141 includes a ROM 148, and the other parts of the magnetic disk unit 141 are essentially the same as corresponding parts of the magnetic disk unit 41 shown in FIG. 3.

In FIG. 9, the host computer 61a and the magnetic disk unit 141 are interconnected by the power line and the system bus. In the ROM 148 of the magnetic disk unit 141, source power control programs which are the same as the source voltage detecting program 67, the first comparing program 68, the second comparing program 69a, and the third comparing program 70a stored in the ROM 65 of the above second embodiment are stored.

In this embodiment, the MPU 42, the ADC 43 and the RAM 44 of this magnetic disk unit 141 can carry out the same functions as the CPU 71, the ADC 64 and the RAM 66. Thus, the magnetic disk unit 141 in this embodiment includes the memory unit, the detecting unit, the first comparing unit, the selecting unit, the control unit, and the switching unit which are the same as those corresponding units of the above second embodiment. Accordingly, it is readily understood that the magnetic disk unit 141, shown in FIG. 9, can also carry out the spindle motor starting control procedure which is the same as that of the above second embodiment.

The foregoing descriptions relate to the source power control procedure of magnetic disk devices. However, the present invention is also applicable to other disk apparatuses, such as optical disk devices, wherein the disk is rotated by the rotating motor in accordance with a controlled source power by monitoring the fluctuation of the source voltage supplied to the rotating motor.

Further, the present invention is not limited to the above-described embodiments, and variations and modifications may be made without departing from the scope of the present invention.

What is claimed is:

1. A disk apparatus which reads data from and writes data onto a disk, wherein the disk is rotated by a rotating motor in accordance with a source power from a host system, and the source power supplied to the rotating motor is monitored, said disk apparatus comprising:

memory means for storing an initial source voltage value before a process of a rotating motor acceleration is started;

detecting means for periodically detecting a source voltage value related to the source power;

comparing means for comparing the source voltage value, detected by said detecting means during the process of the rotating motor acceleration, with the initial source voltage value stored in said memory means, and for outputting a voltage fluctuation indicated by a difference between the source voltage value and the initial source voltage value; and control means for setting a quantity of the source power supplied to the rotating motor, to a smaller quantity in response to the voltage fluctuation output by said comparing means.

2. The disk apparatus according to claim 1, wherein said control means stops the supply of the source power to the rotating motor and transfers an error notification to the host system if the voltage fluctuation, output by said comparing means after the process of the rotating motor acceleration is restarted in accordance with the smaller quantity of the source power, is detected to be greater than a reference value.

3. The disk apparatus according to claim 1, wherein said control means stops the supply of the source power to the rotating motor and transfers an error notification to the host system if the voltage fluctuation, output by said comparing means when the process of the rotating motor acceleration is started in accordance with a rated quantity of the source power, is detected to be greater than a reference value.

4. The disk apparatus according to claim 2, wherein, after the supply of the source power to the rotating motor is stopped by said control means, said control means further stops the supply of the source power to a read/write circuit which drives a head of the disk apparatus.

5. A host system which is connected to a disk apparatus wherein data is read from and written onto a disk while the disk is rotated by a rotating motor in accordance with a source power from a power supply, and the source power supplied to the rotating motor is monitored, said host system comprising:

memory means for storing an initial source voltage value before a process of a rotating motor acceleration is started;

detecting means for periodically detecting a source voltage value related to the source power;

first comparing means for comparing the source voltage value, detected by said detecting means during the process of the rotating motor acceleration, with the initial source voltage value stored in said memory means, and for outputting a voltage fluctuation indicated by a difference between the source voltage value and the initial source voltage value;

selecting means for selecting one of a first mode and a second mode, wherein the first mode is selected by said selecting means to set a quantity of the source power supplied to the rotating motor to a smaller quantity regardless of the voltage fluctuation, and the second mode is selected by said selecting means to set the quantity of the source power supplied to the rotating motor to a smaller quantity in response to the voltage fluctuation; and control means for controlling the quantity of the source power supplied to the rotating motor, in accordance with either one of the first and second modes selected by said selecting means.

6. The host system according to claim 5, wherein said selecting means comprises second comparing means for detecting whether the voltage fluctuation output by said first comparing means is greater than a first reference value, wherein the first mode is selected by said selecting means when the voltage fluctuation is detected to be greater than the first reference value, to supply the smaller quantity of the source power to the rotating motor, regardless of the voltage fluctuation, wherein the second mode is selected by said selecting means when the voltage fluctuation is detected not to be greater than the first reference value, to supply the smaller quantity of the source power to the rotating motor in response to the voltage fluctuation.

7. The host system according to claim 5, further comprising switching means for selecting one of a third mode and a fourth mode after the smaller quantity of the source power is supplied to the rotating motor in accordance with the second mode selected by said selecting means, wherein the third mode is selected by said switching means to set the quantity of the source power supplied to the rotating motor to a smaller quantity in response to the voltage fluctuation, and the fourth mode is selected by said switching means to stop the supply of the source power to the rotating motor.

8. The host system according to claim 7, wherein said switching means comprises third comparing means for detecting whether the voltage fluctuation, output by said first comparing means after the smaller quantity of the source power is supplied to the rotating motor, is greater than a second reference value, wherein the third mode is selected by said switching means when said voltage fluctuation is detected to be greater than the second reference value, so that the smaller quantity of the source power is supplied to the rotating motor in response to the voltage fluctuation, wherein the fourth mode is selected by said switching means when said voltage fluctuation is detected not to be greater than the second reference value, so that the supply of the source power to the rotating motor is stopped.

9. A disk apparatus which is connected to a host system, wherein data is read from and written onto a disk on the disk apparatus while the disk is rotated by a rotating motor in accordance with a source power from a power supply of the host system, and the source power supplied to the rotating motor is monitored, said disk apparatus comprising:

memory means for storing an initial source voltage value before a process of a rotating motor acceleration is started;

detecting means for periodically detecting a source voltage value related to the source power;

first comparing means for comparing the source voltage value, detected by said detecting means during the process of the rotating motor acceleration, with the initial source voltage value stored in said memory means, and for outputting a voltage fluctuation indicated by a difference between the source voltage value and the initial source voltage value;

selecting means for selecting one of a first mode and a second mode, wherein the first mode is selected by said selecting means to set a quantity of the source power supplied to the rotating motor to a smaller quantity regardless of the voltage fluctuation, and the second mode is selected by said selecting means to set the quantity of the source power supplied to the rotating motor to a smaller quantity in response to the voltage fluctuation; and control means for controlling the quantity of the source power supplied to the rotating motor, in accordance with either one of the first and second modes selected by said selecting means.

10. The disk apparatus according to claim 9, wherein said selecting means comprises second comparing means for detecting whether the voltage fluctuation output by said first comparing means is greater than a first reference value, wherein the first mode is selected by said selecting means when the voltage fluctuation is detected to be greater than the first reference value, to supply the smaller quantity of the source power to the rotating motor, regardless of the voltage fluctuation, wherein the second mode is selected by said selecting means when the voltage fluctuation is detected not to be greater than the first reference value, to supply the smaller quantity of the source power to the rotating motor in response to the voltage fluctuation.

11. The disk apparatus according to claim 9, further comprising switching means for selecting one of a third mode and a fourth mode after the smaller quantity of the source power is supplied to the rotating motor in accordance with the second mode selected by said selecting means, wherein the third mode is selected by said switching means to set the quantity of the source power supplied to the rotating motor to a smaller quantity in response to the voltage fluctuation, and the fourth mode is selected by said switching means to stop the supply of the source power to the rotating motor.

12. The disk apparatus according to claim 9, wherein said switching means comprises third comparing means for detecting whether the voltage fluctuation, output by said first comparing means after the smaller quantity of the source power is supplied to the rotating motor, is greater than a second reference value, wherein the third mode is selected by said switching means when said voltage fluctuation is detected to be greater than the second reference value, so that the smaller quantity of the source power is supplied to the rotating motor in response to the voltage fluctuation, wherein the fourth mode is selected by said switching means when said voltage fluctuation is detected not to be greater than the second reference value, so that the supply of the source power to the rotating motor is stopped.

* * * * *